United States Patent [19]

Karakama et al.

[11] Patent Number: 5,136,223
[45] Date of Patent: Aug. 4, 1992

[54] ROBOT OPERATING METHOD CAPABLE OF MANUAL CORRECTION

[75] Inventors: Tatsuo Karakama; Kouichi Okanda, both of Oshino, Japan

[73] Assignee: Fanuc Ltd., Minamitsuru, Japan

[21] Appl. No.: 543,840

[22] PCT Filed: Dec. 8, 1989

[86] PCT No.: PCT/JP89/01234

§ 371 Date: Jul. 19, 1990

§ 102(e) Date: Jul. 19, 1990

[87] PCT Pub. No.: WO90/06836

PCT Pub. Date: Jun. 28, 1990

[30] Foreign Application Priority Data

Dec. 12, 1988 [JP] Japan ................... 63-311858

[51] Int. Cl.[5] ............. G05B 19/403; G06F 15/46
[52] U.S. Cl. .................... 318/573; 318/577; 318/567; 364/474.31; 395/1
[58] Field of Search ............. 318/560–646; 364/513, 474.03–474.30; 901/3, 9, 15–23

[56] References Cited

U.S. PATENT DOCUMENTS

| | | | |
|---|---|---|---|
| 4,367,532 | 1/1983 | Crum et al. | 364/513 |
| 4,385,358 | 5/1983 | Ito et al. | 364/513 |
| 4,420,812 | 12/1983 | Ito et al. | 364/513 |
| 4,432,063 | 2/1984 | Resnick | 364/513 |
| 4,481,591 | 11/1984 | Spongh | 364/513 |
| 4,482,968 | 11/1984 | Inaba et al. | 364/513 |
| 4,484,120 | 11/1984 | Olex et al. | 318/568 |
| 4,550,383 | 10/1985 | Sugimoto | 318/573 X |
| 4,670,849 | 6/1987 | Okada et al. | 318/632 X |
| 4,672,190 | 6/1987 | Rostkowski et al. | 318/577 X |
| 4,675,502 | 6/1987 | Haefner et al. | 318/574 X |
| 4,858,140 | 8/1989 | Buhler et al. | 364/474.31 |
| 4,872,105 | 10/1989 | Mozayeny | 364/474.03 |
| 4,903,213 | 2/1990 | Buhler et al. | 364/474.31 |

Primary Examiner—Paul Ip
Attorney, Agent, or Firm—Staas & Halsey

[57] ABSTRACT

A robot operating method capable of easily performing manual correction of a previously taught teaching point during an automatic robot operation, and of accurately and effectively performing a desired robot operation without the need of employing a visual sensor. After switching is made from an automatic operation mode to a manual operation mode in response to reading of a predetermined command code from a program (S1, S2), a robot tool positioned at a first teaching position is moved to a first working position on a workpiece by a control apparatus which responds to an operation of a remote operation board by an operator, so as to compensate for a dislocation of the teaching point attributable to a positional dislocation of the workpiece (S3), and then a correction data indicative of the results of a manual adjustment is calculated in response to supply of an external signal generated by an operator's operation and is stored in a memory (S4, S5). After completion of robot working at the first working position, second and later teaching points are sequentially corrected based on the correction data in response to reading of a position correcting command code from the program, whereby the robot working is accurately carried out at second and later working positions on the workpiece.

6 Claims, 2 Drawing Sheets

ROBOT OPERATING METHOD CAPABLE OF MANUAL CORRECTION

TECHNICAL FIELD

The present invention relates to a robot operating method, and more particularly, to a robot operating method capable of easily performing manual correction of a teaching point during an automatic robot operation, which point is taught to a robot beforehand, and of accurately and effectively performing a desired robot working without the need of employing a visual sensor.

BACKGROUND ART

It is known to use a robot to carry out working to a workpiece which is transferred along an assembly line and then positioned at a predetermined location on the assembly line. In this case, if the positioning location of the workpiece varies, accurate robot working cannot be carried out even when the robot is operated at an operating position (teaching point) which is previously taught to the robot.

To this end, conventionally, dislocation of the teaching point attributable to positional dislocation of the workpiece is compensated for on the basis of a correction data, which is calculated based on an actual workpiece position detected by a visual sensor and which indicates the error between the actual workpiece position and a reference workpiece position. However, according to the above-mentioned conventional robot operating method, the visual sensor is essentially required, which entails inconvenience.

DISCLOSURE OF THE INVENTION

The object of the present invention is to provide a robot operating method capable of easily performing manual correction of a teaching point during an automatic robot operation, which point is taught to a robot beforehand, and of accurately and effectively performing a desired robot working without the need of employing a visual sensor.

To achieve the above-mentioned object, a robot operating method according to the present invention comprises the steps of: (a) operating a robot in a manual operation mode when a first command code is read out from a program during an automatic robot operation; (b) restarting the automatic operation when a predetermined external signal is supplied during the manual operation, and calculating and storing a correction data indicative of a manual adjustment amount in the manual operation; and (c) correcting a teaching data, read out from the program, in accordance with the correction data when a second command code is read out from the program after the restart of the automatic operation.

As mentioned above, according to the robot operating method of the present invention, the robot is manually operated when the first command code is read out, and the teaching data is corrected on the basis of the correction data, calculated at the time of restarting the automatic robot operation, when the second command code is read out after the restart of the automatic operation. Accordingly, the robot can be manually operated at an appropriate time point during the automatic operation so that a desired manual adjustment is easily carried out, by the use of a program in which the first and second command code are respectively stated at required portions of the program. In addition, the teaching data can be corrected in accordance with the results of the manual adjustment, without the need of employing a visual sensor.

BEST MODE OF CARRYING OUT THE INVENTION

Figure 1:
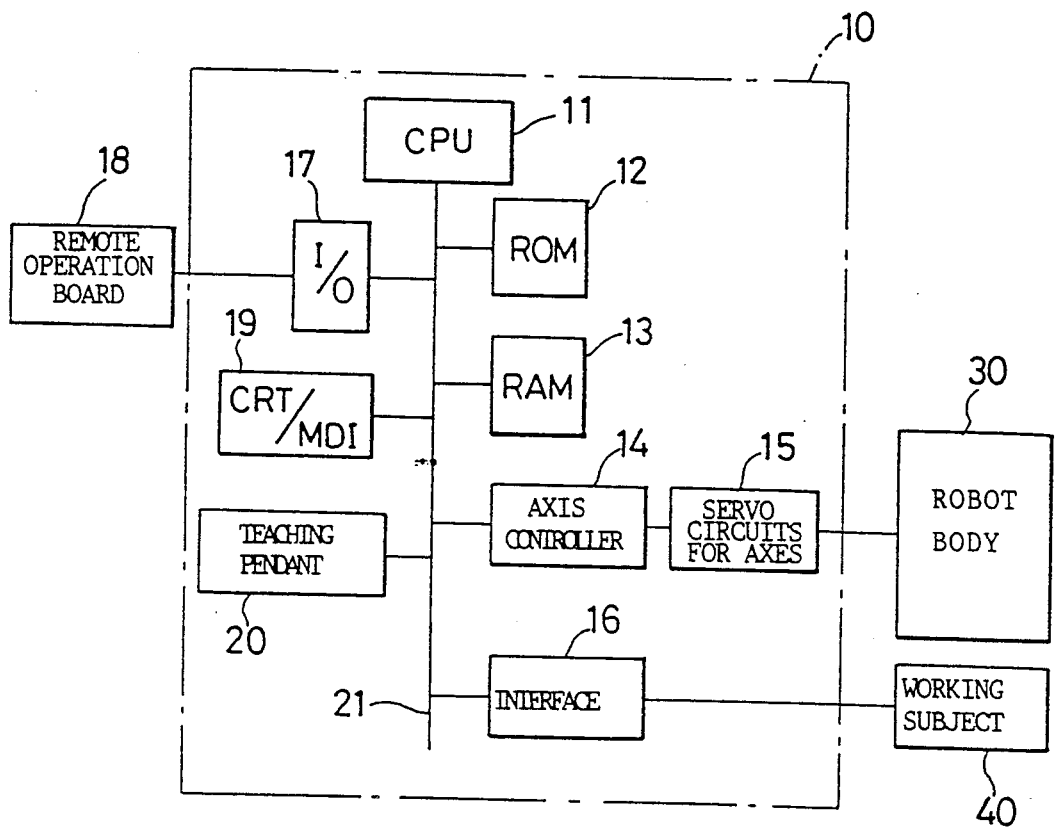
FIG. 1 is a schematic block diagram showing a robot to which a robot operating method according to an embodiment of the present invention is applied.

With reference to FIG. 1, a robot is explained to which a robot operating method is applied according to an embodiment of the present invention.

The robot of FIG. 1 comprises a robot control apparatus 10 which is basically the same in construction as the prior art control apparatus, and a robot body 30 having an arm assembly and a tool assembly (none of which is shown) for performing desired working to a working subject 40 under the control of the control apparatus 10. The robot body 30 is designed, for instance, such that a robot tool is movable along X- and Y-axes of a tool coordinate system, and is rotatable with respect to an axis extending in parallel to a Z-axis of the tool coordinate system, with the position of the distal end of the tool kept unchanged. Further, the robot is so designed, for instance, so as to perform the working to workpieces (working subjects) 40, which are sequentially transferred onto an assembly line, at plural working positions on each workpiece.

The control apparatus 10 comprises a microprocessor (hereinafter referred to as CPU) 11, a ROM 12 storing therein a control program, and a RAM 13 for storing a robot operation program and for temporally storing data and arithmetic results. The control apparatus 10 further comprises an axis controller 14 which includes an interpolation circuit (not shown), an interface 16 connected to the working subject (assembly line) 40, an input/output circuit 17, a manual data input device (hereinafter referred to as CRT/MDI) 19 with a CRT display service, and a teaching pendant 20. The aforesaid elements 12-20 are respectively connected to the CPU 11 through busses 21. In addition, the control apparatus 10 includes servo circuits 15 connected to the axis controller 14 for drivingly controlling individual servomotors (not shown) of the robot body 30. A remote operation board 18 for supplying external signals is connected to the input/output circuit 17.

The robot is so arranged as to be operated in either one of automatic and manual operation modes. In this connection, the remote operation board 18 is arranged to generate first to sixth external signals for driving the robot tool during the manual operation, and a seventh external signal for restarting the automatic operation. The first to fourth external signals correspond to tool movement toward positive X-axis direction, negative X-axis direction, positive Y-axis direction, and negative Y-axis direction, respectively. The fifth and sixth external signals correspond to tool rotation to positive and negative directions, respectively. The control apparatus 10 and the robot body 30 are so arranged as to move or rotate the tool at a predetermined speed, which is parameter-set previously, in response to supply of an arbitrary one of the first to sixth external signals during the manual operation. In relation to the below-mentioned various processes associated with an operating mode selection and a manual adjustment, a predetermined command code "S89, b, n" and a predetermined position correcting command code G45 are employed.

Figure 3:
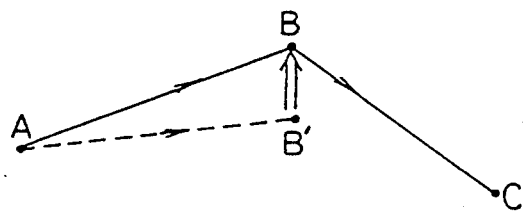
FIG. 3 is a view showing correction of a teaching point, carried out by the robot.

In the following, an operation of the robot constructed as mentioned above will be explained with reference to FIGS. 2 and 3.

First, an operator operates the teaching pendant 20 and the CRT/MDI 19 to create a robot operation program. During the preparation of the robot operation program, the predetermined command code "S89, b, n" (S code) and the predetermined position correcting command code G45 (G code) are respectively inserted into appropriate locations of the program. For instance, the S code is inserted into a block next to a block which contains therein a move command toward a first teaching point, and the G code is stated together with each of teaching data respectively associated with a second and later teaching points. The program thus created is stored in the RAM 13. Alternatively, a robot operation program created previously may be stored in the RAM 13 through the input device (not shown).

During a playback operation of the robot in its automatic operation mode, the CPU 11 executes the robot operation program read out from the RAM 13, to thereby drive the servomotors for the individual axes of the robot body 30 through the axis controller 14 and the servo circuits 15. As a result, the robot tool moves to the first teaching point. When the CPU 11 reads out the predetermined command code "S89, b, n" from the robot operation program (step S1 of FIG. 2) after completion of the movement to the teaching point, the CPU changes the automatic operating mode to the manual operating mode (step S2).

During the manual operation, the operator operates the remote operation board 18, at step S3, to perform manual adjustment so as to accurately position the robot tool at a fist working position A (FIG. 3) on the workpiece 40, which is generally positioned on the assembly line with a certain error, i.e., so as to compensate for positional dislocation, attributable to positional dislocation of the workpiece, of the first teaching point from the working position A with which the first teaching point should primarily coincide. As a result of the board operation, a corresponding one or ones of the first to sixth external signals are supplied from the remote operation board 18 to the control apparatus 10, whereby the robot body 30 is operated under the control of the control apparatus 10 so that, generally, the tool is moved along the X- and Y-axes and rotated around the axis parallel to the Z-axis, to be positioned at the first working position A.

After completion of the positioning, the operator operates the remote operation board 18 so as to supply the seventh external signal b to the control apparatus 10. When the CPU 11 determines the supply of the signal b at step S4, the CPU calculates correction data (4×4 conversion matrix) indicative of a manual adjustment amount which is associated with the tool movement and rotation from the first teaching point to the first working position A. Then, the CPU causes the RAM 13 to store the correction data at its storage region for storing an n-th group of offset data (step S5). Whereupon, the robot working is carried out at the first teaching point A after the manual adjustment (the first working position).

After completion of the robot working, when the CPU 11 reads out the position correcting command code G45, associated with the second teaching point B' (FIG. 3) from the operation program (step S6), the CPU carries out position correction associated with the second teaching point B' by the use of the correction data (conversion matrix) which is read out from the RAM 13 (step S7), and then causes the robot tool to move to the thus corrected teaching point B (step S8). In this manner, the tool is moved to the corrected teaching point B which is determined on the basis of the correction data which varies in dependence on the results of the manual adjustment for compensating for the positional dislocation of the first teaching point, whereby the positional dislocation of the workpiece in relation to the second working position is also compensated. Then, the robot working is carried out accurately, while the dislocations of the third and later teaching points from the third working position C, etc., attributable to the positional dislocation of the workpiece are similarly compensated.

When all the robot working for the first workpiece 40 is completed, the second and later workpieces 40 are positioned on the assembly line in sequence, and then the robot working is carried out accurately in the same manner as that for the first workpiece.

The present invention is not limited to the aforesaid embodiment, but may be modified in various manners.

Figure 2:
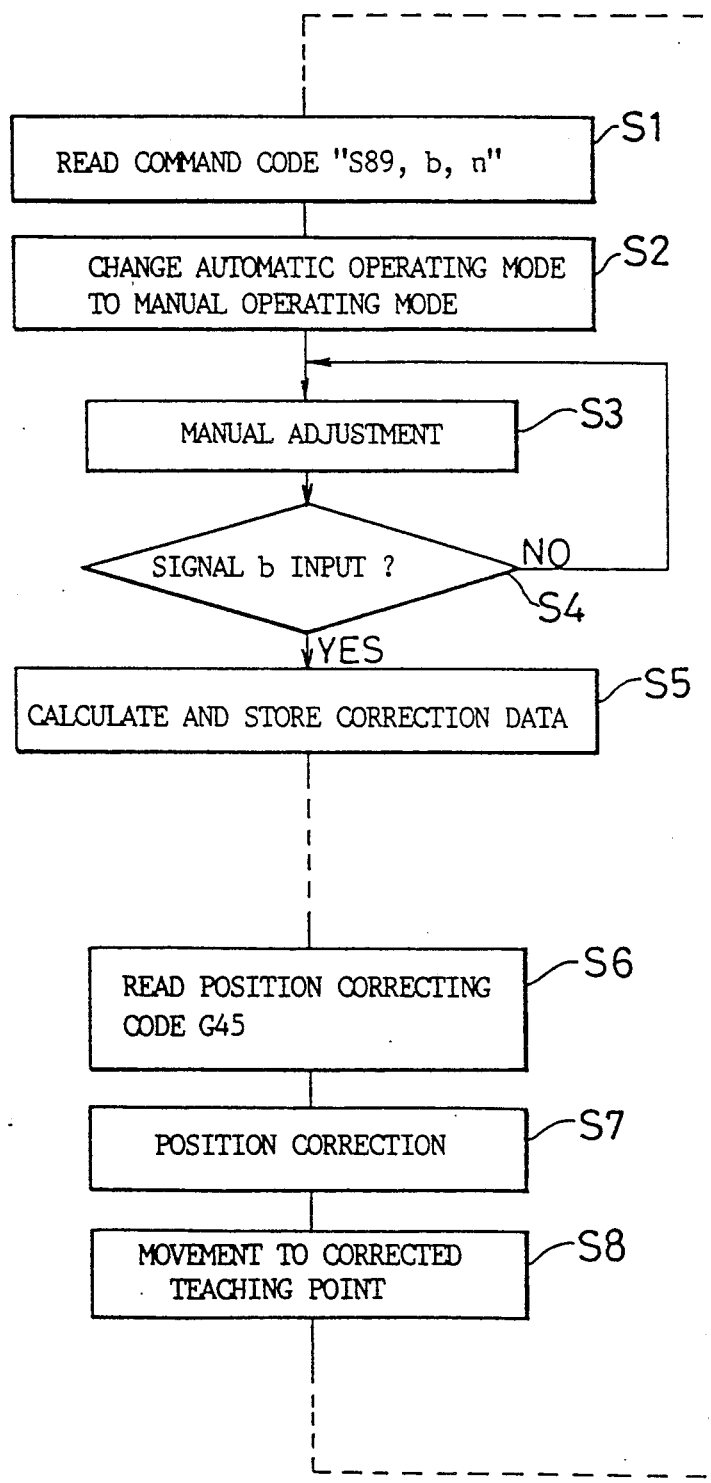
FIG. 2 is a flowchart showing an operation of the robot of FIG. 1.

For instance, the position correction process, corresponding to steps S6–S8 of FIG. 2, even for the first teaching point may be carried out prior to the manual adjustment process. Preferably, the correction data for the position correction is renewed on the basis of a history of the manual adjustments for respective workpieces each time the manual adjustment is carried out. In this case, during the robot working associated with the second and later workpieces, the first teaching point is corrected in accordance with the results of the manual adjustment for the preceding workpiece, preferably, in accordance with a history of the manual adjustments for the respective workpieces up to the preceding workpiece. In general, the workpieces, which are sequentially positioned on the assembly line, for instance, are liable to be dislocated from the predetermined positioning location toward substantially the same direction by substantially the same amount. Thus, if the first teaching point is temporally corrected in accordance with the preceding manual adjustment results, etc., in this manner, a required amount of the manual adjustment for each of the second and later workpieces is reduced, so that efficiency of the manual adjustment operation and hence efficiency of the robot working are improved.

Although in the embodiment the robot working to a single workpiece is effected at plural working positions of the workpiece, the present invention may be applied to that case in which the robot working to each workpiece is performed at a single working position of the workpiece. In this case, preferably, the G code is inserted before the S code as in the aforesaid modification of the present invention, so that the teaching point is temporally corrected in accordance with the result of the manual adjustment for the preceding workpiece, preferably, in accordance with the history of the manual adjustments for the workpieces up to the preceding workpiece, to thereby reduce the manual adjustment amount.

We claim:

1. A robot operating method, comprising steps of:
   (a) operating a robot in a manual operation mode to perform manual adjustment when a first command code is read out from a robot control program during an automatic robot operation;

(b) restarting the automatic robot operation when a predetermined external signal is supplied during the manual operation, and calculating and storing correction data indicative of the manual adjustment amount made during the manual operation; and (c) correcting teaching data, read out from the robot control program, in accordance with the correction data when a second command code is read out from the robot control and controlling the robot in accordance with the teaching data to perform machining program after the restart of the automatic operation.

2. A robot operating method according to claim 1, wherein steps (a) through (c) are repeated to sequentially perform robot working on plural working subjects of a same kind, each robot working being performed at plural working positions of each working subject, and said steps (a) and (b) are executed only for a first working position of each working subject in accordance with the first command code which is inserted into the program in relation only to a first position of the plural working positions.

3. A robot operating method according to claim 2, wherein said step (c) is executed for a second and later working positions of said plural working positions of each working subject in accordance with a number of said second command code each of which is inserted into the program in relation to a corresponding one of the second and later working positions.

4. A method of correcting a working position of a robot performing working on a workpiece, comprising the steps of:

(a) operating the robot automatically by executing a robot control program;

(b) operating the robot manually, when a predetermined command code is executed in step (a), to correct the working position of the robot to conform to an actual position of the workpiece by moving the robot to a new working position, and then to restore automatic operation of the robot; and (c) correcting position data to conform to the new working position and operating the robot automatically by executing the control program in accordance with the corrected position data, to perform working on the workpiece starting at the new working position.

5. A method according to claim 4, additionally comprising (d) repeating steps (a) through (c) so that previous corrections of the position data are taken into account each time the position data is corrected.

6. A method of correcting a working position of a robot performing working on a workpiece, comprising the steps of:

(a) operating the robot automatically by executing a robot control program;

(b) operating the robot manually, when a predetermined command code is executed in step (a), to correct the working position of the robot to conform to an actual position of the workpiece by moving the robot to a new working position, and then to restore automatic operation of the robot; and (c) correcting position data to conform to the new working position and storing the position data; and (d) operating the robot automatically be executing the robot control program in accordance with the corrected position data stored in step (c), to perform working on the workpiece starting at the new working position.

* * * * *